United States Patent Office 3,122,790
Patented Mar. 3, 1964

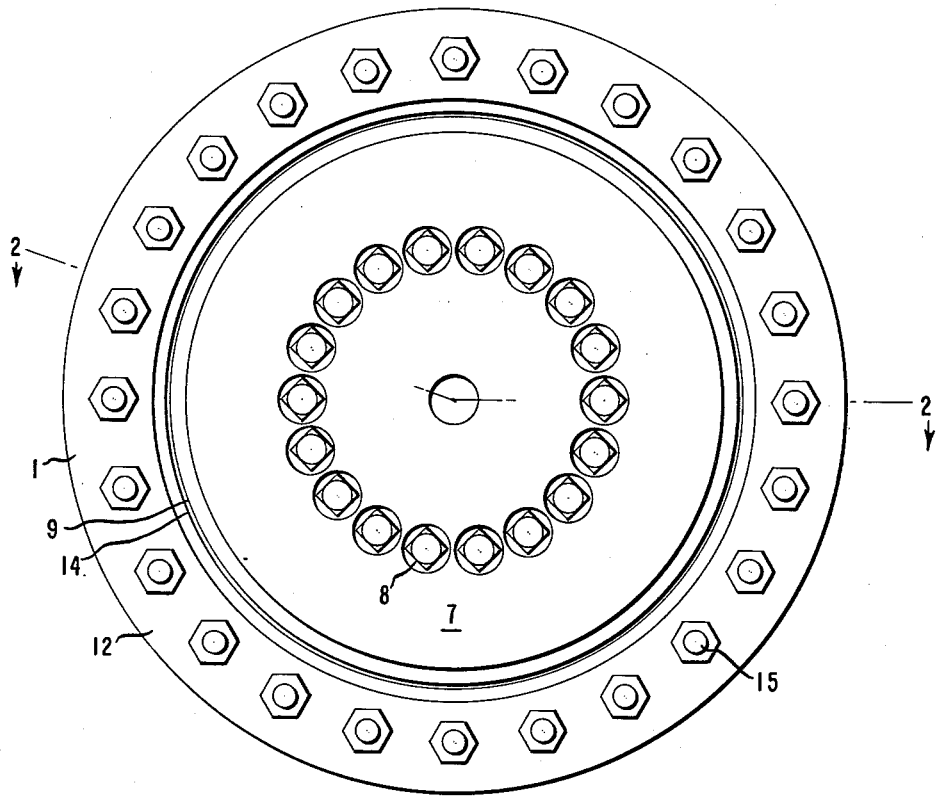
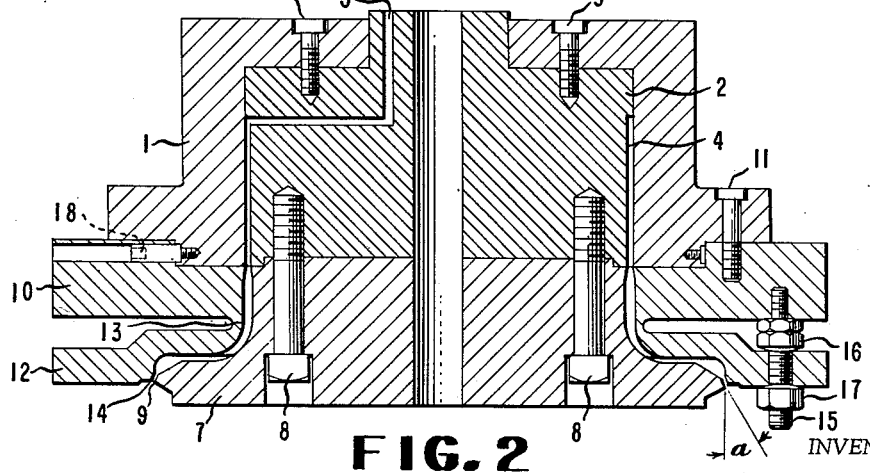
RICHARD JAMES ALBERT
INVENTOR
BY A. Ralph Snyder,
ATTORNEY

3,122,790
EXTRUSION DIE
Richard James Albert, Orange, Tex., assignor to E. I. du Pont de Nemours and Company, Wilmington, Del., a corporation of Delaware
Filed Oct. 23, 1961, Ser. No. 146,883
3 Claims. (Cl. 18—14)

This invention relates to an extrusion die for plastic substances and particularly to a circular extrusion die adapted to form a thermoplastic material into a tube which is extruded continuously from the die.

One of the most important requirements in the production of films, particularly those to be used in the packaging trade, is that the film should be uniform in thickness. In the production of films by extruding plastic materials through a flat die considerable progress has been made in developing techniques for making corrections in gauge or thickness and films with a reasonably satisfactory gauge uniformity has been achieved. The situation in the production of continuous films by extruding plastic materials in the form of continuous tubing through a circular die has been up to this time less favorable.

A typical commercial tubular or circular die has an annular orifice, the gap of which is adjusted by centering a relatively rigid outer ring about a stationary inner mandrel. With this design, absolute gap opening is fixed because of the fixed diameters of the parts and accuracy of the gap opening is generally dependent upon the centering technique and the precision with which the two parts forming the annular orifices are machined and ground. The machining tolerances necessary to insure gauge uniformity with extrusion dies of this type are expensive to attain. Also, the time needed to precisely center the rigid outer ring is often excessive, resulting in lost production and waste.

It is therefore an object of this invention to provide a circular extrusion die which will produce film having improved gauge or thickness uniformity. It is a further object to provide a circular extrusion die which is readily adjustable for producing film having uniform gauge and for the production of film of differing thickness with a minimum of delay for casting die adjustments. It is a still further object to provide an improved circular die having a relatively low cost and simple construction. The foregoing and related objects will more clearly appear from the description which follows.

These objects are realized by the present invention which, briefly stated, comprises a circular die for tubular extrusion of plastic material comprising in combination a relatively rigid annular die body, a mandrel coaxial with said die body and fixedly spaced therefrom to provide between the inner boundary of the annular die body and the periphery of the mandrel a coaxial annular passageway for plastic material in communication with a feed port, a rigid mandrel extension secured coaxially to said mandrel, the curved surface of said mandrel extension defining an inner lip of an annular die orifice in register with said passageway, said lip having a land section in a plane which is at an angle within the range of from about 15° to about 45° with respect to the axis of the die, an annular outer lip member comprising a rigid annular plate secured to and concentric with said die body and said mandrel extension, and a concentric flexible annular plate substantially parallel to, and spaced from said rigid plate and integrally joined at one edge to the rigid plate through a relatively thin fulcrum section, said flexible plate having a land section substantially spaced from said fulcrum section, said last named land section being proximately opposed to the inner lip land section and in a plane substantially parallel to the plane of the inner lip land section, said land sections together defining said annular die orifice, said flexible plate being engaged through a plurality of individually adjustable means operative to effect positive advance and retraction of pre-selected discrete portions of said flexible plate relative to the opposed face of said rigid plate.

A preferred embodiment of my invention will now be described with reference to the accompanying drawing wherein:

FIG. 1 is a plan view from the discharge end of the embodiment to be particularly described; and FIG. 2 is a section taken on the line 2—2 of FIG. 1.

Referring to the drawing, the die is of rigid construction and comprises an annular die body 1 and a mandrel 2 secured coaxially to the die body by bolts 3 and spaced therefrom to provide an annular passageway 4 (for the flow of plastic material) which communicates with the feed port 5, and at the bottom of the die is in register with the annular die orifice defined by the lip members of the die. A rigid mandrel extension 7 is concentrically and removably secured to mandrel 2 by bolts 8. The mandrel extension is provided at its free edge with a land section 9 defining the inner wall of the lip opening and said land section is in a plane at an angle α in the range of from not below about 15° to not above about 45° with respect to the axis of the die. The outer removable lip member comprises a rigid annular plate 10 rigidly and concentrically affixed to die body 1 by bolts 11, a concentric flexible annular plate 12, and a relatively thin section 13 connecting plates 10 and 12 which serves as a fulcrum point when flexible plate 12 is flexed in the manner hereinafter described. Rigid and flexible annular plates 10 and 12, respectively, and connecting fulcrum section 13, together form a removable annular outer lip member which is generally U-shaped in cross-section. Flexible plate member 12 is provided with a land section 14 which is substantially spaced from fulcrum section 13 and which is proximately opposed to land section 9 and is in a plane substantially parallel to the plane of land section 9. Land section 14 defines the outer wall of the lip opening. A plurality of adjusting bolts 15 are mounted in plate 10 at equally spaced points in a circular path adjacent the free edge of said plate and each projects through an aligned opening in flexible plate 12 and engages said plate by means of a set of lock nuts 16 and 17 which together provide an anti-backlash adjusting means. Means for accurate centering of the outer lip member with respect to the axis of the die is provided by a series of spaced set screws 18.

In operation either major or predetermined localized flexing of the flexible plate of the outer lip member is accomplished by moving all or any desired number of the sets of lock nuts toward or away from the rigid plate. Such flexing of the flexible plate about the fulcrum section will serve to either increase or decrease the distance between opposed land sections 9 and 14 with a consequent increase or decrease in the lip opening to the desired extent throughout its whole circumference or at preselected increments depending on the number and location of the individual adjustments.

It will be obvious to one skilled in the art that various arrangements of the elements of the flexible lip die other than the preferred embodiment above described may be made without departing from the spirit and scope of my invention. The essential feature of my invention resides in the provision of a circular die adjustable lip wherein the adjustable element is substantially washer shaped, i.e., is a circular, relatively thin flexible element in a single plane, and hence is capable of being flexed in increments, as contrasted with the heretofore suggested arrangement wherein the adjustable die lip is part of a cylindrical element which is necessarily inflexible and must be moved as a unit to effect changes in the lip opening.

As mentioned, the angle of the lip opening (i.e., the plane of the land sections) with respect to die axis is preferably between 20° and 35°; angles as low as 15° can be employed. In general, for tubular extrusion it is not desirable to us an angle greater than 45°. The specific angle or range of angle that are operable is to a considerable extent governed by the type of blowing or orienting operation that occurs subsequent to the extrusion step.

With respect to types of adjusting means for the flexible lip, lock bolts, as previously stated, are convenient and low in cost. However, other means, such as wedges, springs and linkages, may be used, the essential requirement being that they be free of backlash.

The various components of the die can be fabricated as separate units and then assembled and secured by bolts and appropriate fastening means as shown. However, it will be clear to those skilled in the art that at least some of the components can be of unitized or welded construction.

With the flexing lip arrangement of my invention the small adjustments necessary to insure gauge uniformity on individual sections of the annular lip may be made readily, and also large variations up to as much as 10 mils or more can be made on the entire annular lip section. Thus, it is possible to change the lip opening for the production of widely different gauge films or extrusion of different polymers without making a die change or without changing the essential lip portions of the die.

The following examples of the specific application of the flexible lip circular die will serve to further illustrate the principles and practice of my invention.

*Example 1*

A polyethylene resin prepared essentially as described by Fawcett et al. U.S. Patent 2,513,553, having a melt index of 2.0 was extruded through a 20 mil opening of a 24 inch diameter die provided with a flexible lip as hereinabove described at a rate of 140 feet per minute and over a shaped cooler similar to that illustrated in FIGURE 5 of U.S. Patent 2,966,700, to form a sheet 1.5 mils thick and 100 inches in circumference. The film was very uniform in thickness across the sheet with maximum variations in thickness of ±5%.

In a similar experiment using the same polyethylene resin and with the same apparatus except that a commercial fixed die lip arrangement was used in place of the flexible lip arrangement, the 1.5 mils film obtained showed thickness variations of ±20%.

*Example 2*

A linear polypropylene resin having a density of 0.902 was extruded at 225° C. through the circular die of this invention in the form of continuous tubing, which was thereafter oriented by expanding the tubing and by subjecting the tubing to a stretching tension in the axial direction. The resulting film was very uniform in thickness, with variations in thickness being no greater than ±5%.

As a control, the same resin was extruded through a commercial fixed lip die and the resulting tubing was oriented as described for the test film; the film showed thickness variations of ±25%.

*Example 3*

Following the procedure of Example 2, a linear polyethylene having a density of 0.954 was extruded through a 12-inch diameter flexible lip die (FIGURE 2) at an extrusion temperature of 215° C. and was thereafter stretched 6X (where X is the original dimension just prior to stretching) in both the length direction and in the transverse direction. Maximum thickness variations of the resulting film were ±6%.

The same resin extruded through the same apparatus but with a fixed lip die gave a film with thickness variations of ±20%.

*Example 4*

A blend comprising 75% by weight of "Alathon" [1]– 1413 low-density (0.915) resin and 25% "Alathon" [1]– 7020 high-density (0.958) resin was extruded through a 24-inch diameter flexible lip die at a melt temperature of 175° C., with a lip opening of 20 mils. The extruded tube was drawn upwardly from the die at a rate of 50 feet per minute by means of draw rolls positioned above the die. Sufficient air was introduced into the extruded tubing to expand the tubing to a diameter of 32 inches. Thereafter the supply of air was cut off and the air within the tubing comprised an isolated bubble sealed in the tubing between the die and the nip of the draw rolls. After the tubing was drawn through the draw rolls it was slit into two flat sheets and wound on individual winding drums. Maximum thickness variations across the sheet was ±7%; a similar film extruded in the same way, but wherein a conventional fixed lip die was used in place of the flexible lip die of this invention, had maximum thickness variations of ±25%.

It will be evident from the foregoing description and examples that the principal advantage of the flexible lip die of this invention is that it provides superior gauge uniformity and that it is relatively simple, low in cost and easily operable. The adjustments to the die lips can be made readily while the die is in operation. Of special value is the fact that this die lip arrangement provides film of uniform gauge over extended periods of operation and through process upsets.

I claim:

1. A circular die for tubular extrusion of plastic material comprising in combination a relatively rigid annular die body, a mandrel coaxial with said die body and fixedly spaced therefrom to provide between the inner boundary of the die body and the periphery of the mandrel a coaxial annular passageway for plastic material in communication with a feed port, a rigid mandrel extension secured coaxially to said mandrel, the curved surface of said mandrel extension defining an inner lip of an annular die orifice in register with said passageway, said lip having a land section in a plane which is at an angle within the range of from about 15° to about 45° with respect to the axis of the die, an annular outer lip member comprising a rigid annular plate secured to and concentric with said die body, and a concentric flexible annular plate substantially parallel to, and spaced from said rigid plate and integrally joined at one edge to the rigid plate through a relatively thin fulcrum section, said flexible plate having a land section substantially spaced from said fulcrum section, said last named land section being proximately opposed to the inner lip land section and in a plane substantially parallel to the plane of the inner lip land section, said land sections together defining said annular die orifice, said flexible plate being engaged through a plurality of individually adjustable means operative to effect positive advance and retraction of preselected discrete portions of said flexible plate relative to the opposed face of said rigid plate.

[1] "Alathon" polyethylene resin—Du Pont registered trademark.

2. The circular extrusion die of claim 1 wherein said adjustable means comprises a plurality of spaced bolts mounted on said rigid plate at spaced intervals in a path adjacent the outer periphery of rigid plate and extending thru said flexible plate through holes in said flexible plate in register with said bolts, and lock nuts on said bolts and in engagement with said flexible plate operative to flex discrete areas of said flexible plate with respect to said rigid plate.

3. The circular extrusion die of claim 1 wherein said land sections are in planes at an angle of from 20° to 35° with respect to the die axis.

References Cited in the file of this patent

UNITED STATES PATENTS

| | | |
|---|---|---|
| 2,765,492 | Vevel | Oct. 9, 1956 |
| 2,952,872 | Bueux et al. | Sept. 20, 1960 |
| 2,978,748 | McCauley et al. | Apr. 11, 1961 |
| 2,998,624 | Ricketts | Sept. 5, 1961 |
| 3,039,143 | Nicholson | June 19, 1962 |

FOREIGN PATENTS

| | | |
|---|---|---|
| 1,013,865 | Germany | Aug. 14, 1957 |